Jan. 28, 1969  A. B. GROSE  3,424,431
FUEL CONTROL VALVE
Filed Sept. 25, 1967

INVENTOR.
ANSEL B. GROSE

United States Patent Office 3,424,431
Patented Jan. 28, 1969

3,424,431
FUEL CONTROL VALVE
Ansel B. Grose, 8 Mount Vernon St.,
Stoneham, Mass. 02180
Filed Sept. 25, 1967, Ser. No. 670,140
U.S. Cl. 251—333     6 Claims
Int. Cl. F16k *1/06, 15/04, 31/18*

ABSTRACT OF THE DISCLOSURE

A fuel contol valve having an internally disposed chamber, a fuel inlet passageway, a pair of ball members in said chamber, one functioning as valve means for opening and closing said passageway against an annular curved seat disposed between said chamber and passageway.

FIELD OF THE INVENTION

Fuel control valves of the ball type for use with carburetors of internal combustion engines wherein the working parts are so correlated as to shapes and dimensions as to permit the valve to function more freely and positively in maintaining the level of fuel in the bowl of the carburetors at the exact amount under all conditions of use and for a greatly prolonged period of time.

DESCRIPTION OF THE PRIOR ART

A prior art type of valve embodies a main body portion having a fuel passageway therein communicating with the main fuel coupling of the conventional fuel pump of a carburetor.

The fuel passageway communicates with a larger straight parallel sided chamber having an open outer end and having, at its opposite inner end, a hollow inwardly tapered section which is of an acute angle of approximately 41° and which communicates with an annular curved valve seat in said tapered section on the side thereof toward the adjacent end of the passageway.

A small ball valve of a diameter slightly larger than the diameter of the passageway is positioned within the tapered section and is held therein and in engagement with the valve seat by a larger actuating ball located within the chamber and of a diameter only slightly smaller than the diameter of the chamber. The actuating ball is held in the chamber by displacing the edge of the open end of the chamber slightly inwardly. The larger actuating ball protrudes outwardly of the inwardly displaced edge of the chamber so as to be engaged by the lever arm of a conventional type carburetor whose movement is in response to a float within the fuel containing bowl of the carburetor.

The above valve construction was designed to cause the small ball valve to have a spinning self cleansing action with respect to the valve seat and to positively seat with the valve seat regardless of the line of force imparted thereon by the rise of the float in the fuel bowl of the carburetor as more fully defined in Patent No. 3,180,354.

While the above valve construction proved to be much more efficient than earlier prior art constructions it was found in a few instances, particularly when designed for use with large trucks and high performance cars, such as racing cars, the small ball valve had a tendency to bounce or snap as well as to spin at a high speed when the valve was opened under the pressure of the fuel pump. This bouncing or snapping, in some instances, after prolonged use, had a peening action on the valve seat which caused the seat to eventually become depressed or distorted to the extent that the small ball valve would stick within the seat and become inoperative.

Another problem which occurred in a few instances was the accumulation of particles of dirt around and between the large actuating ball and the inner parallel walls of the chamber in which the ball is held.

A further problem was that of preventing burrs from being formed in the valve seat during the fabrication of the valve, particularly when forming the restricted fuel passageway. All of the above problems, when encountered, greatly reduced the desired function of the valve.

SUMMARY OF THE INVENTION

It will be appreciated from the following description that the present invention has been directed to eliminating the above mentioned defects and to provide a valve which will operate with greater ease and accuracy for a prolonged period of time.

This is accomplished by forming a curved recessed area between the annular curved valve seat and the large ball chamber. The curved recessed area allows the fuel to more readily spread out around the small ball valve and provides a cushioning effect for obviating the bouncing and snapping of the small ball as well as providing a braking action against excessive spinning of the small ball, particularly, as it approaches the curved valve seat during the closing of the valve.

The side walls of the large ball chamber are, according to the principles of this invention, tapered outwardly in a direction away from the annular curved valve seat to provide a progressively increasing space between the large ball and said sidewalls as said ball moves in a direction away from the valve seat under the pressure of the fuel pump whereby foreign matter carried by the fuel may be more readily flushed outwardly to the valve.

The fuel passageway is also tapered outwardly in a direction toward the valve seat by the use of a tapered reamer whereby the reamer will immediately be spaced from the sides of the passageway as it is withdrawn from said passageway. This is to avoid forming a burr which, in some instances in the past, was found to remain in the valve seat when a straight reamer was used.

The fuel outlet openings in the side walls of the valve are also increased in number to reduce the area to area relation of the inner walls of the chamber in respect to the large actuating ball to further insure the flushing of foreign matter outwardly of the valve.

The present invention will be more fully understood by reference to the accompanying drawings and following detailed description of an actual embodiment thereof.

DESCRIPTION OF THE PREFERRED EMBODIMENT

Figure 1:
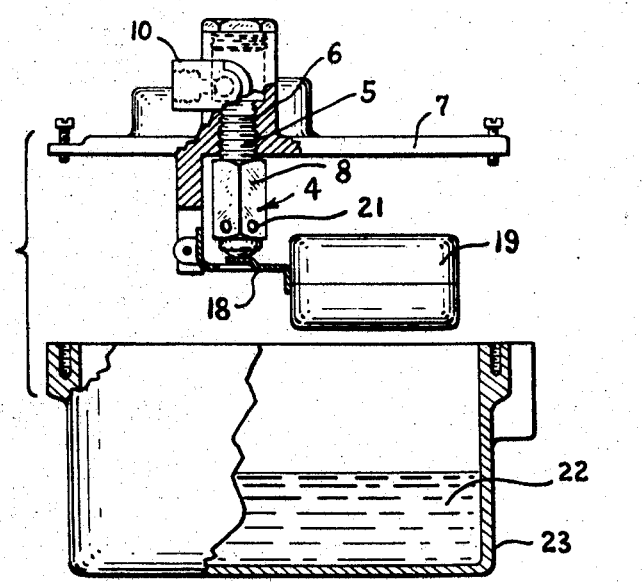
FIG. 1 illustrates in side elevation and partly in section an embodiment of the present invention.
Figure 2:
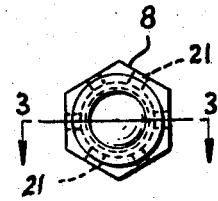
FIG. 2 is a bottom plan view of the valve assembly.
Figure 3:
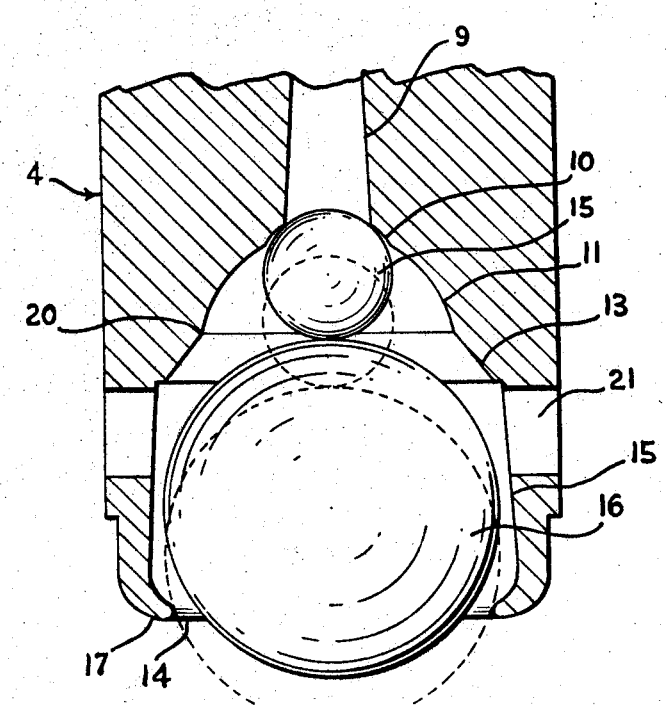
FIG. 3 is an enlarged fragmentary sectional view of the invention taken as on line 3—3 of FIG. 2 looking in the direction of the arrows.

As shown in the drawings the valve embodying the invention comprises a main body portion 4 having a threaded end portion 5 by means of which the said portion may be threadedly attached into a thread opening 6 in the fuel bowl cover plate 7 of a conventional type carburetor. Exteriorly of the main body portion 4 there is provided a hexportion 8 whereby the said body portion may be threaded into or out of the threaded opening 6 by the use of a wrench.

Internally of the main body portion 5 there is a restricted passageway 9 communicating with the main fuel coupling 10 by means of which a main fuel line from a conventional fuel pump, not shown, is connected with the carburetor. The passageway communicates with a curved valve seat 10 formed in the adjacent end of the passageway. The restricted passageway, in accordance with the present invention, is tapered outwardly in a direction toward the valve seat 10 through the use of a tapered reamer whereby the reamer will immediately be spaced from the sides of the pasageway as it is withdrawn from the passageway at the completion of the reaming operation. This is to avoid forming a burr in the valve seat 10 as was the case, in many instances in the past, when a straight reamer was used to form the passageway.

The valve seat 10, according to the principles of this invention, communicates with a curved recessed area 11 formed in a tapered section 12 which, in turn, communicates with an enlarged chamber 13 formed internally of the main body portion 4. The chamber is tapered outwardly in a direction away from the valve seat 10 to an open end 14 and is another feature of the invention.

A small ball valve 15 of a diameter slightly larger than the diameter of the adjacent end of the passageway 9 and of a radius slightly smaller than the radius of curvature of the valve seat 10 is located in the curved recessed area 11 and is held in said area by a larger actuating ball 16 which is of a diameter slightly less than the diameter of the chamber 13 at a location adjacent the curved recessed area. The actuating ball 16 is held in the tapered chamber 13 by displacing the edge of the open end of the chamber slightly inwardly as shown at 17. The length of the chamber and size of the open end 14 is such as to allow a portion of the large actuating ball 16 to protrude outwardly of said open end an amount only sufficient to be engaged by the arm 18 of the float 19 of the carburetor in a conventional manner. This allows the large actuating ball to open and close the small ball valve in response to the amount of fuel 22 in the bowl 23 of the carburetor. The length of the chamber is also controlled to limit the displacement of the large ball 16 whereby it will not allow the small ball valve to be displaced from within the curved recessed area 11 and become jammed between the large ball and the curved recessed area. The edge 20 of the tapered section 13 is so formed as to extend inwardly and aid in preventing displacement of the small ball valve from within said recessed area 11.

Diametrically opposed openings 21 are formed in each of the hexagonal side walls of the main body portion 4 at a location on the side of the center line of the large actuating ball toward the small ball valve to reduce the area to area relation of the inner walls of the chamber with respect to the large actuating ball and to increase the speed of flow of the fuel outwardly of the valve. This further insures the flushing of foreign matter outwardly of the valve.

It has been found, as the result of extensive research, that the forming of a curved recessed area 11 in the previously tapered section 13 obviates the bouncing or snapping of the small ball valve 15 between the valve seat 10 and the large actuating ball 16 when the valve is opened under the pressure of the fuel pumped through the passageway 9. This is believed to be due to the fact that the direct force of the fuel coming out of the passageway 9 is so diverted as to allow the fuel to spread out around the small ball valve. This spreading of the fuel also has a braking action on the small ball valve which greatly reduces the speed of spin, particularly as it approaches the curved valve seat 10 during the closing thereof.

The above features enables the valve to function more easily, eliminates distortion of the valve seat and reduces wear for a greatly prolonged period of time.

The tapering of the inner sidewalls of the chamber 15 in a direction toward the open end 14 is such as to progressively increase the space between the large actuating ball 16 and the inner walls of the chamber whereby foreign matter carried by the fuel may be more readily flushed outwardly of the valve as it opens.

It should be understood that although the valve has been described for use with carburetors it may be used with other fluid flow control devices of a similar nature. The preferred use of the valve has been shown and described only by way of illustration.

I claim:
1. A fuel control valve comprising:
   a main body portion;
   a passageway internally of the body portion;
   a valve seat communicating with the inner end of the passageway;
   a curved recessed area communicating with the valve seat;
   a chamber in said body portion larger than the passageway communicating with the curved recessed area and having an open outer end; said chamber having its side walls tapering outwardly toward said open end;
   a relatively small ball valve in said recessed area of a size slightly larger than the passageway adapted to engage said valve seat;
   a separate large actuating ball in said chamber of a diameter slightly smaller than the diameter of the chamber at its end adjacent the curved recessed area adapted to engage said small ball valve in one position of movement to hold said small ball valve in engagement with said valve seat and in another position of movement away from said valve seat to allow said small ball valve to be dislodged from said seat;
   means adjacent the open end of the chamber for retaining the large actuating ball in said chamber and being such as to limit the movement of the large actuating ball toward said open end by an amount sufficient to prevent the small ball valve from being displaced outwardly of the curved recessed area; and
   a plurality of openings in the side walls of the body portion communicating with the chamber on the side of the center line of the large actuating ball toward the small ball valve.

2. A fuel control valve as recited in claim 1 wherein the passageway is tapered outwardly in the direction of the curved valve seat.

3. A fuel control valve as recited in claim 1 wherein the valve seat is of a curvature slightly greater in radius than the radius of the small ball valve.

4. A fuel control valve as recited in claim 1 wherein the means for retaining the large actuating ball in the chamber is a turned in edge at the open end of the chamber.

5. A fuel control valve as recited in claim 1 wherein a tapered section is located between the curved recessed area and the large ball chamber and tapers from adjacent the inner edge of the chamber toward said recessed area.

6. A fuel control valve as recited in claim 1 wherein the main body portion has an outer hexagonal shape and the plurality of openings result from forming an opening in each of the outer side surfaces of said body portion.

References Cited

UNITED STATES PATENTS 3,180,354　4/1965　Grose _____ 137—449 X
3,269,406　8/1966　Grose _____ 137—449 X ARNOLD ROSENTHAL, Primary Examiner.

U.S. Cl. X.R.

137—436, 449